3,281,378
Patented Oct. 25, 1966

3,281,378
DIISOCYANATO SUBSTITUTED ALIPHATIC CARBOXYLIC ACID ESTER URETHANE REACTION PRODUCTS
John Douglas Garber, Westfield, and David Wasserman, Springfield, N.J., and Robert Allen Gasser, Elkton, Va., assignors to Merck & Co., Inc., Rahway, N.J., a corporation of New Jersey
No Drawing. Filed June 6, 1963, Ser. No. 285,888
8 Claims. (Cl. 260—2.5)

This invention relates to novel reaction products useful in the preparation of polyurethane articles such as films, coatings, castings, binders and adhesives. More particularly, it relates to reaction products of esters of diisocyanate substituted aliphatic acids with polyhydroxyl compounds useful in the production of non-yellowing, gloss-retaining, polyurethane articles, and strongly adhesive polyurethane films, coatings, castings, binders and adhesives.

This application is a continuation-in-part application of copending application, Garber et al., Serial No. 73,483, filed December 5, 1960, now abandoned.

The provisions of polyurethane articles such as films, coatings, foams, castings, elastomers, binders and adhesives is of widespread commercial importance, particularly in those areas where highly durable articles are necessary. The polyurethane compositions currently available, however, are generally characterized by their inability to retain good color and gloss properties, as manifested by their tendency to discolor or yellow upon exposure to sunlight and to lose gloss and adhesive properties on weathering. These are highly undesirable features in those applications where good color and gloss and adhesion retention properties are necessary and the acceptance of polyurethane compositions has been greatly limited in these area as a consequence. Another disadvantage in the prior art compositions with respect to their use as films, coatings and adhesives stems from the insolubility of the parent diisocyanates in inexpensive, non-toxic, non-objectionable solvents. They are further characterized in that they exhibit relatively poor adhesion to aged surface coatings, particularly of the polyurethane type.

It is an object of the present invention to provide novel compositions which yield essentially non-yellowing and gloss-retaining polyurethane articles.

It is another object of the invention to provide novel compositions which yield urethane films, coatings and castings possessing good color and gloss retention properties without sacrificing other good physical properties normally associated with polyurethane films.

Another object is to provide polyurethane compositions which are soluble in aliphatic hydrocarbons.

Another object is to provide polyurethane compositions which exhibit greater adhesive strength to aged surface coatings as well as uncoated surfaces.

Yet another object of the invention is to provide novel compounds.

These and other objects will become more apparent when consideration is given to the following detailed disclosure.

According to the present invention, it has been discovered that the use of a specific class of diisocyanates in reaction with a polyol or mixtures of polyols results in compositions which yield polyurethane articles possessing the extremely desirable color stability characteristics referred to. In addition, when the polyurethane articles are films, enhanced gloss retention properties are obtained and when the articles are used as adhesives or binders, better adhesive strength is obtained. Thus, the invention, in one of its aspects, resides in the discovery that such diisocyanates are capable of producing the desired results. The diisocyanates contemplated for use are diisocyanato substituted aliphatic monocarboxylic acid esters or dicarboxylic acid esters of the following structure:

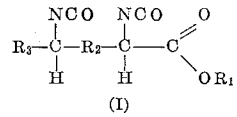

(I)

wherein $R_1$ can be alkyl, alkoxyalkyl, aryl, alkaryl, aralkyl, either unsubstituted or substituted with halogen radicals, $R_2$ is a lower alkylene or a lower alkylidene radical, $R_3$ can be either hydrogen, or the radical

Typical of the diisocyanates represented by the foregoing formula are: the esters of 2,6-diisocyanato caproic acid (lysine diisocyanate) such as the methyl, ethyl, propyl, butyl, octyl, dodecyl, stearyl, methoxymethyl, β-methoxyethyl, γ-ethoxypropyl, phenyl, benzyl, o-tolyl, o-(2-chlorotolyl), 2-bromoethyl, 1,2-dichloropropyl, 2,3-dichloropropyl, and isopropyl esters; the esters of 2,5-diisocyanato valeric acid (ornithine diisocyanate) such as ethyl, propyl, butyl, hexyl, octyl, dodecyl, stearyl, ethoxymethyl, β-ethoxyethyl, phenyl, benzyl, o-tolyl, o-(2-chlorotolyl), 2-chloropropyl, 2,3-dichloropropyl and isopropyl esters; the diesters of 2,4-diisocyanato glutaric acid, 2,5-diisocyanato adipic acid, 2,6-diisocyanato pimelic acid, 2,7-diisocyanate suberic acid, 2,9-diisocyanato sebacic acid such as the dimethyl, diethyl, dipropyl, dibutyl, dioctyl, distearyl, diphenyl, dibenzyl, di(o-tolyl), di(o-(2-chlorotolyl)), di(2-chloropropyl), di(2,3-dichloropropyl), and diisopropyl diesters and mixed diesters such as methyl-propyl diesters, phenyl-octyl diesters, and benzyl-stearyl diesters. The diisocyanates may be either the levo rotatory forms or the dextro rotatory forms, racemates or mixtures thereof. The diisocyanates preferred for use are the alkyl esters of 2,6-diisocyanato caproic acid, and most preferably the methyl and octyl esters.

The foregoing diisocyanates are utilized to prepare the compositions of the invention by reacting them with a sufficient amount of polyol material to provide an NCO/OH ratio in the reactants of at least 0.1 and preferably from 0.1–6.0. Thus, the reaction products of the invention are either hydroxyl-terminated, isocyanate-terminated, or contain an equal number of reacted hydroxyl groups and isocyanate groups depending on the NCO/OH ratio in the reactants employed. As used herein, the term "polyol" is meant to include compounds or polymers containing two or more hydroxyl groups per molecule and include further diols, triols, tetrols, pentols, hexitols and the like and mixtures of any of these, as well as polyesters and polyethers which contain two or more hydroxyl groups per molecule. Further, the term "polyol" is meant to apply to an organic compound or mixture in which all species have two or more hydroxyl groups per molecule and no other functional groups which react at a significant rate with an isocyanate group at 25° C.

Representative of the polyols which may be employed are diols such as ethylene glycol, propylene glycol, β,β-dihydroxy diethyl ether (diethylene glycol), dipropylene glycol, 1,4-butylene glycol, 1,3-butylene glycol; polyethers such as polypropylene glycol, polyethylene glycol, polybutylene glycol or copolymers of olefin oxides; hydroxyl-terminated polyesters such as prepared from adipic acid and diethylene glycol or from a phthalic acid and ethylene glycol; hydroxyl-terminated polyurethanes such as the reaction product of the diisocyanates of Formula I and any of the foregoing listed diols; diols prepared from any transesterfication between a fatty acid ester and a polyol such that a combination of diols results; and the like; compounds having more than two hydroxyl groups per molecule such as glycerine, trimethylol propane, pentaerythritol, sorbitol, α-methyl glucoside, 1,2,6-hexanetriol, castor oil, sucrose; hydroxyl-rich polyethers made by condensing ethylene oxide, propylene oxide or butylene oxide with a simple polyol such as listed above or with other polyfunctional compounds such as ethylene diamine, ethanolamine, etc.; hydroxyl-rich polyesters made by condensing a dibasic acid such as adipic, succinic, sebacic, phthalic with simple diol-triol mixtures selected from the above, hydroxyl-rich polyurethanes such as the reaction products of the disocyanates of Formula I with any of the above; and the like. The preferred polyols are aliphatic polyols having a molecular weight less than about 200. Most preferred are propylene glycol, 1,4- or 1,3-butylene glycol, glycerine, trimethylolpropane, and pentaerythritol.

The foregoing lists of polyols are intended to be merely illustrative and are not to be considered as limiting the scope of the invention. Any polyol reactable with a diisocyanate to form a urethane may be employed. Furthermore, a wide variety of combinations may be employed to yield reaction products possessing the advantageous characteristics of color and gloss retention imparted thereto by the presence of the specific disocyanates.

The compositions may be prepared by allowing the polyol material to react with the diisocyanate in predetermined proportions, preferably though not necessarily, in a solvent solution and preferably for a sufficient length of time to allow the essentially complete reaction between isocyanate groups and hydroxyl groups. It is also preferred to have the various reagents and solvents in anhydrous form to prevent premature and undesirable reactions between the isocyanate groups and water. It will be appreciated by those skilled in the art that some of the properties of the products and final molecular weight may be varied according to the ultimate use to which the composition will be put, and this is largely within the individual preference of the processors. These properties and those of the articles produced therefrom may be varied by regulating the chain length and functionality of the polyol components, the chain length of the ester group in the diisocyanate ($R_1$ in the formula) and the NCO/OH ratio of the reactants within the ranges indicated. In general, use of high molecular weight polyols (mol. weight 1000 and higher) causes the final product to be soft and rubbery whereas low molecular weight polyols yield hard, tough compositions.

The reaction temperature will be general be dependent upon the nature of the starting materials used and is not of itself critical with respect to the invention. However, as hereafter specified, certain combinations of temperature and reaction time result in products not wholly suitable for preparing polyurethane articles because of the formation of various physical forms difficult or impossible to process. Such conditions should be avoided. The reaction is exothermic and, once initiated, proceeds well with or without catalysts when reaction temperatures in the range of from 20° C. to 100° C. are employed and this temperature range is preferred. Most preferably the range is from 60° C. to 80° C. and the reaction is complete in about 4 hours. However, reactions outside this temperature range and particularly on the high side can be tolerated if they are not allowed to proceed for a length of time sufficient to result in gel formation such as would yield a composition unsuitable, for processing reasons, for preparing polyurethane articles. In this regard, the desired reaction is between isocyanate groups and hydroxyl groups to form a urethane linkage. It is also possible, however, to effect a reaction between an isocyanate group and active hydrogen atoms on groups other than hydroxyl groups. Thus, the isocyanate group will react with the —NH segment of a formed urethane linkage at a temperature of about 100° C. and higher to form an allophanate. Similarly, a urea linkage plus isocyanate results in a biuret. These reactions, if allowed to proceed too far, will result in gel formation and such gels present definite processing disadvantages. Therefore, the extent of these reactions should be controlled to prevent premature gelation. The actual conditions of time and temperature necessary to achieve this will depend in general upon the reactants employed, and their molecular weight. Since a wide variety of reactants is possible it is difficult to fix any figures of a general nature. The foregoing temperature range of 20–100° C. is adequate to effect the proper reaction without the likelihood of gel formation existing due to the above side-reactions. Additionally, there may be added to the reaction mass any adjuvants commonly used in the art such as antioxidants, pigments, plasticizers, catalysts, surfactants and the like.

When a solvent is employed for the reaction between the diisocyanates and the polyols, or when the final reaction product is solubilized preparatory to use as a coating composition, there may be used any of those solvents normally used in the preparation of polyurethane coatings. For example, for the lower alkyl esters of the diisocyanates used in preparing the compositions such solvents as non-hydroxyl containing esters, ethers and aromatic hydrocarbons as exemplified by amyl acetate, butyl acetate, ethyl acetate, Cellosolve acetate, methyl Cellosolve acetate, xylene, toluene, benzene, carbon tetrachloride, and the like may be employed. However, it is an added feature of the invention that the diisocyanate higher alkyl esters of the type wherein $R_3$ is hydrogen and $R_1$ is an alkyl radical having 6 or more carbon atoms or wherein

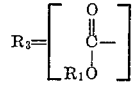

and $R_1$ is an alkyl radical having 4 or more carbon atoms, and adducts produced therefrom, are surprisingly soluble in alkanes or cycloalkanes and, in general, the kerosene type solvents. This is a distinct advantage in that these last named solvents are much less objectionable in their toxicity, unpleasantness and cost than are the solvents employed with the lower alkyl ester diisocyanates and for this reason represent a further advance in the art. Representative of the solvents suitable for this last named group are hexane, heptane-octane blends, gasoline kerosene, naphtha, cyclohexane and the like. Heretofore, the only way to impart naphtha solubility to a polyurethane composition was to modify it with an oil such as linseed oil, soybean oil, and the like.

Those compounds represented by the foregoing diisocyanate Formula I wherein $R_3$ is hydrogen and $R_1$ is haloalkyl, alkoxyalkyl, aryl, alkaryl, aralkyl, alkyl having from 6 to 14 carbon atoms, and halogenated derivatives of the foregoing are novel as are the compounds represented when $R_3$ is the radical

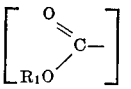

and $R_1$ is alkyl, alkoxyalkyl, aryl, aralkyl, alkaryl radicals either unsubstituted or halogen substituted. Typical of the first named group are hexyl, heptyl, octyl, decyl, dodecyl and tetradecyl esters of 2,5-diisocyanato valeric acid and 2,6-diisocyanato caproic acid, the β-bromoethyl, β-methoxyethyl, γ-chloropropyl, phenyl, benzyl, and 1,3,5-trichlorophenyl esters of 2,6-diisocyanato caproic acid. Typical of dicarboxylic acid ester compounds are: the dimethyl, diethyl, dipropyl, dibutyl, dioctyl, distearyl, diphenyl, dibenzyl, di(o-tolyl), di(o - (2 - chorotolyl)), di(2-chloropropyl), di(2,3-chloropropyl), and diisopropyl diesters of 2,5-diisocyanato adipic acid 2,6-diisocyanato pimelic acid, 2,7-diisocyanato suberic acid, 2,9-diisocyanato sebacic acid and the like, and mixed diesters of these such as the methylpropyl diesters, the phenyl-octyl diesters, and the benzylstearyl diesters.

The parent diisocyanates used in the compositions of the present invention may be prepared in accordance with the disclosure set forth in the copending application previously referred to, Serial No. 73,483 filed December 5, 1960. As taught therein the appropriate diamino alkanoic or diamino alkanedioic acids, preferably in the form of an acid addition salt thereof and most preferably as a dihydrohalide or a diarylsulfonate salt such as di-p-toluene sulfonate, are esterified with alcohols containing the desired ester radicals. The reaction conditions are not critical and will depend on the boiling points of the alcohols used. It is preferred to run the esterification at the reflux temperature of the reaction system. Where solid alcohols are employed suitable solvents may be selected. Certain of the diamino alkanoic or alkanedioic acid esters produced are novel compounds. These novel compounds in free base form are represented by the formula

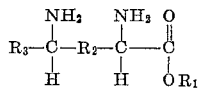

wherein $R_1$ can be alkyl, alkoxyalkyl, aryl, alkaryl, aralkyl, either unsubstituted or substituted with halogen radicals, $R_2$ is a lower alkylene or a lower alkylidene radical, $R_3$ can be hydrogen or the radical

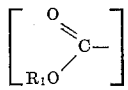

provided that when $R_3$ is hydrogen, $R_1$ is as above defined except that an unsubstituted alkyl radical has from 6 to 14 carbon atoms, and provided further that when $R_3$ is the radical

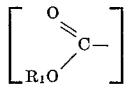

each $R_1$ group may not at the same time be methyl or ethyl. The acid addition salts may be converted to the free base form by conventional techniques, as by ion exchange for example.

The diamino acid esters or salts thereof are then reacted with phosgene in the presence of a suitable solvent. Such solvents should, of course, be inert with respect to the reactants employed under the reaction conditions used. As representative solvents there may be named chlorobenzene, orthodichlorobenzene, bromotoluene, chlorotoluene, benzene, toluene, dioxane, 4-chloro-1,3-xylene, and dialkyl ethers of glycols and polyether glycols. A suitable temperature for the phosgenation reaction is in the range of from 50° C. up to 200° C. although the actual temperature employed will be dependent upon the particular ester used. Generally, the lower alkyl esters of the diisocyanato alkanoic acids are preferably produced using a phosgenation temperature of between 130° C. and 160° C. whereas the higher alkyl, alkoxyalkyl, aryl, alkaryl and aralkyl esters of the diisocyanato alkanoic acids are preferably produced at phosgenation temperatures in the range of 50° C. up to 100° C. The reactions may, however, be run at lower temperatures, with an increase in the reaction time. Pressures up to 1000 p.s.i. may also be applied to the system during phosgenation provided the by-produced hydrogen chloride is suitably separated from the reaction system.

The compositions of the present invention may be utilized in preparing a wide variety of polyurethane articles including films, coatings, castings, elastomers, foams, binders, adhesives, and the like in the manner well known in the art. Those compositions prepared from an NCO/OH ratio in the reactants of at least unity and preferably from 1.0–2.0 are outstandingly suitable for preparing films and coatings. For example, after adding a suitable amount of solvent to these compositions, they may be brushed onto a particular surface and then cured either by air drying at room temperature or by heating up to a temperature of about 120° C. or so in the presence of sufficient moisture to accelerate the cure and to improve the physical properties of the film. This is generally known as a one component or moisture-cured system. Alternatively, the compositions may be mixed just prior to use with a hydroxyl-containing polymer such as a polyester or a polyether of suitable molecular weight. This is generally known as a two component system. A "blocked" film or coating system may be prepared by reacting the compositions with a blocking agent such as phenol, acetyl acetone, cresols, and the like so as to block the free isocyanate groups. A solvent solution of this adduct which also contains a polyester or other polyol may then be applied to a surface and cured by heating the coating to a temperature sufficient to decompose the adduct and allow cure by reaction of isocyanate groups with hydroxyl groups. Yet another one component film and coating system involves the reaction of the parent diisocyanates or compositions of the present invention with hydroxyl containing oils containing a high degree of unsaturation. A film prepared from this final "oil-modified" composition is then cured by air drying wherein the unsaturated fatty acid groups react with oxygen. The films and coatings produced from the compositions of the invention possess an extremely high degree of color stability and gloss retention upon exposure to sunlight or very strong ultraviolet light illumination for prolonged periods of time. This is in contrast to the extreme discoloration of films derived from aromatic diisocyanates similarly exposed. In addition, the films and coatings exhibit a higher degree of adhesion to aged surface coatings and to surfaces in general than do the films and coatings of the art.

In addition, those isocyanate-terminated reaction products prepared from reactants having an NCO/OH ratio of greater than unity may be foamed to produce cellular materials having the desired color stability referred to. The foaming may be effected by introducing into the reaction product a quantity of water and/or Freon in accordance with known foaming techniques.

The reaction products of the invention prepared from an NCO/OH ratio in the reactants of unity or less, preferably between 0.5–1.0, and preferably with a polyol reactant wherein the groups are provided from a polyol or a mixture of a diol and compound of higher hydroxyl functionality, are useful in preparing moldings or cast articles useful in the encapsulating field, electrical insulation field, preparation of rolls of various kinds, and the like. The castings may be prepared by adding the diisocyanate to the polyol component and warming gently until the reaction mixture is homogenous, casting the material in a suitable mold, and effecting cure at an elevated temperature, of the order of 100–150° C. for a period of time depending on the materials used. The compositions of the invention yield, as heretofore mentioned, castings and moldings possessing remarkable color and gloss retaining properties and good adhesive characteristics.

Hydroxyl-terminated reactions products of the invention prepared from an NCO/OH ratio in the reactants of from about 0.1 to about 0.7, and wherein the hydroxyl groups are preferably, though not necessarily, supplied from only a polyol having more than two hydroxyl groups per molecule, are useful in preparing adhesives and binders possessing a high degree of adhesive and binding capacity and exceptional color and gloss retention properties, using conventional techniques.

Isocyanate terminated reaction products may be employed to produce elastomeric compositions as heretofore indicated, by curing with amines or polyols, and such compositions will be non-yellowing upon prolonged exposure to light when the curing system does not involve aromatic compounds.

Those compositions prepared from the diisocyanate esters of Formula I, wherein the ester group is halogenated are useful in preparing polyurethane articles having reduced flammability characteristics over those not containing halogen groups. The extent to which the flammability is reduced depends on the particular halo groups present and the number of equivalents thereof. For example, a bromo group is more effective than a chloro groups in the extent to which flammability is reduced though each is more effective than the unhalogenated ester group.

The following examples are given for purposes of illustration only and not by way of limitation.

EXAMPLE 1

A mixture of 890 parts of linseed oil and 136 parts of pentaerythritol (1:1 mol ratio) is transesterified using a calcium naphthenate catalyst at 250° C. to produce a partial ester diol. This diol, hydroxyl number equal to 214, is divided into two aliquots. To each is added sufficient diisocyanate to make the NCO/OH ratio equal to 1:1. In one case, 2,6-diisocyanato methyl caproate (lysine diisocyanate, methyl ester) is used, and in the other, toluylene diisocyanate. Each mixture is diluted to 60% solids with xylene and gradually heated to 90° C. After three hours at this temperature the free isocyanate content of each is less than 0.1%. After adding conventional lead-cobalt driers, films are cast. Both give tack-free films within 24 hours, though the diisocyanato methyl caproate based coatings are softer (Sward hardness=30 vs. 45 for toluylene diisocyanate type). No signifiant difference in resistance to solvents, soap or cold water is noted but a significant improvent in adhesion is noted for the aliphatic product.

After exposure for 500 hours to a strong U.V. light source, the toluylene diisocyanato-based film is noticeably yellow whereas the diisocyanato methyl caproate ester film is only a faint yellow. This difference shows up markedly in a pigmented (TiO$_2$) enamel prepared from these two vehicles. Similar tests with a soybean oil-derived vehicle show substantially no yellowing in the case of the lysine-diisocyanate, methyl ester product but significant discoloration in the toluylene diisocyanate product.

EXAMPLE 2

*Part A.*—A mixture of 10.75 mols of 2,6-diisocyanato methyl caproate (lysine diisocyanate, methyl ester), 2.0 mols of trimethylol propane and 3.0 mols of 1,3-butanediol (total NCO/OH about 1.8) is refluxed in anhydrous ethyl acetate (75% solids) for 3 hours. At that time the —NCO content of the solution has leveled off at 10.6%.

*Part B.*—A polyether glycol in the molecular weight range of 400 to 2000, in this case polypropylene glycol, average molecular weight equal to 1000 is provided.

Parts A and B are blended so that the NCO/OH ratio is 1.5. The resulting solution is cast or brushed on as a film. Drying is effected by the reaction of the isocyanate groups with the terminal hydroxyl groups as well as with the moisture in the air.

After exposure of this film to strong sunlight for one week, no discoloration is evident. In contrast, a similar film made using toluylene diisocyanate in place of the diisocyanato methyl caproate exhibited noticeable yellowing.

The use of hydroxyl terminated polyesters in Part B above instead of a polyether yields film of similar quality.

EXAMPLE 3

The reaction between 2,6-diisocyanato methyl caproate and anhydrous sorbitol is carried out in dimethyl formamide (1 part per part or sorbitol, volume:weight) using four different NCO/OH ratios. The reaction temperature ranges between 100–110° C. and is carried out for one hour.

| Run | Charge/Parts by Weight | | NCO/OH |
|---|---|---|---|
| | Diisocyanate | Sorbitol | |
| A | 2.12 | 3.64 | 0.17 |
| B | 4.24 | 5.46 | 0.22 |
| C | 6.36 | 7.28 | 0.25 |
| D | 2.12 | 1.82 | 0.33 |

The hydroxyl-terminated products are recovered by quenching the reaction process into 10 volumes of toluene. When used as the Part B component of Example 2, non-yellowing films are obtained.

EXAMPLE 4

Formulation of lysine-diisocyanate, methyl ester as a one-component polyurethane coating system is as follows. The following reactants and solvents are charged into the reaction vessel:

| | |
|---|---|
| Lysine-diisocyanate, methyl ester | 170.0 |
| Trimethylol propane | 26.8 |
| Butylene glycol 1,3 | 9.0 |
| Polypropylene glycol (1000 mol wt.) | 100.0 |
| Methyl cellosolve acetate | 102.0 |
| Xylene | 102.0 |

The total NCO/OH ratio is 1.6. All solvents and reactants are anhydrous, i.e. they contain less than 0.02% water. The solution is warmed and allowed to react exothermically, while the temperature is maintained at 80–85° C. After three hours the free isocyanate content is constant at about 4.9–5.0% NCO.

Films cast from this composition dry hard overnight at a temperature of 80° F., relative humidity 80%, to a tough, adherent, glossy finish. Catalysts such as dibutyl tin dilaurate may be added (0.01% on total solids) to reduce the drying time still further. Exposure of the clear or pigmented films to sunlight or artificial lights does not cause noticeable color change after several months. Similar films based on toluylene-diisocyanate are markedly discolored.

EXAMPLE 5

A solution of 90 parts of butanediol-1,4, 134 parts of trimethylol propane and 1080 parts of 2,6-diisocyanato dimethyl pimelate is prepared in a mixture of 200 g. of methyl Cellosolve acetate and 200 grams of xylene. The NCO/OH ratio of reactants is 1.6. This mixture is heated at 80° C. for 3 hours and then 282 parts of phenol added. After the solution has cooled to room temperature, 1500 parts of polypropylene glycol (mol wt. = 1000) is added. The viscosity does not change detectably during two weeks' storage at 20° C.

Upon coating a metal plate and baking at 400° F. in a circulating air oven, a hard, tough film results, which upon prolonged exposure to sunlight remains colorless. The evolved phenol and solvents are recovered for re-use.

EXAMPLE 6

A mixture of 9.3 parts of 2,6-diisocyanato n-octyl caproate and 1.34 parts of anhydrous trimethylol propane providing an NCO/OH ratio of about 2.0 is maintained at 70–75° C. for several hours until the —NCO content is constant at or near the theoretical value of 10.8%. The warm liquid is then diluted to about 70% solids with petroleum benzin (principally pentanes and hexanes). Catalysts, e.g. dibutyl tin dilaurate at a level of 0.025% based on solids, may be added to decrease the drying time.

Film cast or brushed on are tack-free when allowed to dry at 80° F. and 70% or higher relative humidity. After a week or a shorter time if force dried for a few hours at 250° F., the optimum film properties are reached. They are hard, tough and colorless and remain so after exposure to sunlight, strong U.V. light or to prolonged aging at 200–220° F.

EXAMPLE 7

A mixture of 3 mols of 2,5-diisocyanato n-decyl valerate and 1 mol of trimethylol propane is heated at 70° C. for 3 hours. Petroleum benzin is added to give a clear solution at 65% solids content. When pigmented with $TiO_2$, films laid down over wood and metal are glossy and snow-white and remain so for over six months when exposed to northeast light.

EXAMPLES 19 THROUGH 23

The procedure followed in the foregoing Examples 10 through 18 is followed using the components indicated in Table II except that the solvent mixture of the foregoing examples is replaced by petroleum benzin (mixed hydrocarbon solvents, chiefly pentanes and hexanes) to demonstrate the solubility in low cost, nontoxic solvents. In each case, the resulting film retains its non-yellowing highly glossed, strongly adhesive properties upon prolonged exposure to sunlight.

TABLE II

| Ex. No. | Diisocyanate Component Type | Wt. Percent | Polyol Component Type | Wt. Percent | Diol Component Type | Wt. Percent | NCO/OH |
|---|---|---|---|---|---|---|---|
| 19 | 2,6-diisocyanato dodecyl caproate | 91.5 | Pentaerythritol | 8.5 | None | 0 | 2.0 |
| 20 | 2,5-diisocyanato hexyl valerate | 85.7 | Hexanetriol-1,2,6 | 14.3 | do | 0 | 2.0 |
| 21 | 2,6-diisocyanato dibutyl pimelate | 84.7 | Reaction product of 3 moles propylene oxid with 1 mole of trimethyl propane (Dow Chemical Co. triol, Voranol CP-260). | 15.3 | do | 0 | 2.65 |
| 22 | 2,6-diisocyanato octyl caproate | 87.4 | Trimethylol propane | 12.6 | do | 0 | 2.0 |
| 23 | 2,6-diisocyanato hexyl caproate | 86.0 | Glycerol | 7.1 | Butanediol 1,4 | 6.9 | 1.85 |

EXAMPLE 8

A mixture of 3 mols of 2,6-diisocyanato stearyl caproate and 1 mol of glycerol is heated with stirring at 80° C. until a homogenous solution resulted. The resulting product is dissolved in kerosene and used as a slow-drying, very flexible film former. The drying time and film hardness resembles that of a bodied drying oil.

EXAMPLE 9

The di-hexyl ester of 2,6-diaminopimelic acid is prepared and converted to the diisocyanate with phosgene. The adduct with trimethylol propane (NCO/OH = 3) is prepared and found to be soluble in petroleum benzin. Films cast are thoroughly dry after aging at 80° F. and 75% humidity for 24 hours and are glossy and essentially non-yellowing upon exposure to strong light.

EXAMPLES 10 THROUGH 18

The following procedure is followed in preparing compositions from the ingredients designated in Table I below. The polyol and diol components are blended together to achieve a homogeneous solution adding heat if necessary to melt the polyol. The diisocyanate component is then added to this blend and the reaction temperature maintained at about 70° C. for about 10 hours or until the free isocyanate content of the reaction mixture is substantially constant. A 1:1 mixture of toluene or xylene with methyl Cellosolve acetate is added to the reaction product in an amount sufficient to bring the solids content to 50%. Thereafter the solutions are filtered and films are cast therefrom. The films are dried at 75° F. and 40% humidity for seven days. In each case, a non-yellowing, strongly adhesive, highly glossed film is obtained.

EXAMPLE 24

2,5-diisocyanato dimethyl adipate

A suspension of α,α'-diaminoadipic acid in methanol is prepared and anhydrous HCl passed in until the mol ratio of diaminoadipic to methanol to HCl is 1:20:3. After the exothermic reaction is completed, the reaction mixture is aged at 65° C. for 4 hours and the product isolated in finely divided form by precipitation into diethyl ether.

Dimethyl-α,α'-diaminoadipate dihydrochloride is added to o-dichlorobenzene and heated to 140° C. while passing in phosgene. When the solids are all dissolved, the reaction mixture is stripped at 145° C. with dry nitrogen for 30 min. and the solvent removed in vacuo. Finally, the product 2,5-diisocyanato dimethyl adipate is collected as a water-white liquid, B.P. 130 at 0.1 mm.

An adduct of 3 mols, 2,5-diisocyanato dimethyl adipate plus 1 mol of trimethylol propane is prepared by heating the two components to 65° C., holding at this temperature and gradually adding ethyl acetate to keep the reaction mixture fluid. The final solution has a solids content of 63% by weight and an NCO content of 8.8%. Films cast from this solution and dried at 40° C. and 40% relative humidity give a hard, tough, non-yellowing coating. Alternately, this solution is used as one component of a two-component system: a polypropylene glycol of 300 mol. wt. is blended with the adduct such that the ratio of NCO to OH is 1.5. Again, a tough coating results. When the polyol component is ground with $TiO_2$ prior to mixing in a two component system a rapid drying, glossy, non-yellowing enamel is obtained.

TABLE 1

| Ex. No. | Diisocyanate Component Type | Wt. Percent | Polyol Component Type | Wt. Percent | Diol Component Type | Wt. Percent | NCO/OH |
|---|---|---|---|---|---|---|---|
| 10 | 2,5-diisocyanato methyl valerate | 83.8 | Glycerol | 9.7 | Ethylene glycol | 6.5 | 1.6 |
| 11 | do | 49.7 | Reaction product of 3 mols propylene oxide with 1 mole trimethylol propane (Dow Chemical Co. triol designated Voranol CP-260). | 16.0 | Polypropylene glycol (PPG), m.w.=1,000. | 31.4 / 2.9 | 1.6 |
| 12 | 2,5-diisocyanato butyl-valerate | 58.6 | Trimethylol propane | 8.2 | PPG, m.w.=1,000 / Butylene glycol 1,3 | 30.4 / 2.8 | 1.5 |
| 13 | do | 68.6 | do | 10.9 | PPG, m.w.=410 / Butylene glycol 1,3 | 16.6 / 3.7 | 1.3 |
| 14 | 2,6-diisocyanato ethyl caproate | 49.2 | Hexanetriol-1,2,6 | 7.3 | Ethylene adipate, m.w.=n800 approx. 800. | 43.5 | 1.6 |
| 15 | 2,9-diisocyanato dimethyl sebacate | 89.0 | Glycerol | 6.6 | Ethylene glycol | 4.4 | 1.6 |
| 16 | 2,6-diisocyanato diethyl pimelate | 63.7 | Trimethylol propane | 7.2 | PPG, m.w.=1,000 / Butanediol,1,4 | 26.7 / 2.4 | 1.6 |
| 17 | 2,6-diisocyanato propyl caproate | 79.5 | Pentaerythritol | 7.5 | Hexamethylene glycol 1,6 | 13 | 1.5 |
| 18 | do | 31.0 | Trimethylol propane | 4.3 | PPG, m.w.=2,000 | 64.7 | 1.62 |

EXAMPLES 25 THROUGH 32

The following procedure is followed in preparing compositions from the components listed in Table III below. In all cases the weight percentages of components used, provides an NCO/OH ratio of unity. The diisocyanate component is added to the polyol, or to the polyol-diol mixture where a diol is shown, with gentle warming if necessary and mixing to obtain a homogeneous mass. The liquid is then cast in a suitable mold, cured for four hours at 100° C. followed by post-curing at 120° C. for an additional four hours. All castings are glossy and are non-yellowing upon prolonged exposure to light.

|  | Gms. |
|---|---|
| Diol [1] | 37.5 |
| Tetrol [2] | 12.5 |
| Water | 0.3 |

[1] Molecular weight of 2000 and made by adding ethylene oxide to polypropylene glycol (M.W. 1800) so that 10% glycol the weight of the polymer is polyethylene glycol and the terminating hydroxyl groups are primary. Available under the name Pluronic L-61—Wyandotte Chemical Company.

[2] Molecular weight of 3000 and made by reacting ethylene diamine with propylene oxide to yield a polypropylene glycol derivative of mole weight 2700 and then adding 10% ethylene oxide by weight to yield a primary hydroxyl-terminated polymer. Available under the name Tetronic 701—Wyandotte Chemical Company.

TABLE III

| Ex. No. | Diisocyanate Component Type | Wt. Percent | Polyol Component Type | Wt. Percent | Diol Component Type | Wt. Percent | Properties |
|---|---|---|---|---|---|---|---|
| 25 | 2,6-diisocyanato methyl caproate | 50.0 | Trimethyl propane | 13.0 | PPG, m.w.=410 | 37.0 | Soft, rubbery. |
| 26 | 2,5-diisocyanato methyl valerate | 76.4 | Glycerol | 23.6 | None | | Hard, tough. |
| 27 | 2,6-diisocyanato dibutyl pimelate | 67.5 | Reaction product of 3 moles propylene oxide with 1 mole trimethylol propane (Dow Chemical Co. triol designated Varanol OP 260). | 32.5 | do | | Medium hard. |
| 28 | 2,6-diisocyanato n-octyl caproate | 58.7 | Trimethylol propane | 10.2 | PPG, m.w.=410 | 51.1 | Do. |
| 29 | 2,6-diisocyanato methyl caproate | 74.5 | Glycerol | 12.9 | Butanediol 1,4 | 12.6 | Hard, tough. |
| 30 | 2,6-diisocyanato β-bromoethyl caproate. | 77.5 | Trimethylol propane | 22.5 | None | | Hard, tough, self-extinguishing. |
| 31 | 2,6-diisocyanato γ-chloropropyl caproate. | 75.5 | do | 24.5 | do | | Hard, tough, burns with difficulty. |
| 32 | 2,6-diisocyanato β-methoxy ethyl caproate. | 71.0 | Glycerine | 0.2 | Diethylene glycol | 28.8 | Dispersible in water. |

EXAMPLES 33 THROUGH 38

The reaction of the diisocyanates and polyols shown in Table IV is effected at the indicated NCO/OH ratios to produce isocyanate-terminated prepolymers. All reactions are carried out in Cellosolve acetate at 15% nonvolatile content for 6 hours at 80° C. Films cast from the prepolymers and dried at 30° C., 40% relative humidity, are glossy and essentially non-yellowing upon exposure to strong light.

TABLE IV

| Ex. No. | Diisocyanate | Polyol | NCO/OH | Drying Time (1 mil film) |
|---|---|---|---|---|
| 33 | 2,6-diisocyanato-n-octyl caproate | Trimethylol propane | 1.9 | 4 hours. |
| 34 | 2,6-diisocyanato-n-tetradecyl caproate. | Glycerine | 1.6 | 48 hours. |
| 35 | 2,5-diisocyanato-n-decyl valerate | Trimethylol ethane | 1.7 | 24 hours. |
| 36 | 2,6-diisocyanato phenyl caproate | Pentaerythritol | 2.0 | 1 hour. |
| 37 | 2,5-diisocyanato benzyl valerate | 1,2,6-hexanetriol | 1.9 | 4 hours. |
| 38 | 2,5-diisocyanato-di-n-butyl adipate. | Trimethylol propane | 1.8 | 8 hours. |

EXAMPLE 39

A mixture of 1000 parts of polypropylene glycol, mol. wt. 1000, and 1272 parts of 2,6-diisocyanato methyl caproate is heated at 80° C. for 6 hours. The ratio of NCO/OH, 6.0, is high enough to prevent polymerization and essentially all of the diol is converted to a diurethane adduct (isocyanate-terminated). The reaction mixture, containing 1 mol. of adduct and 4 mols of unreacted diisocyanate is forced through a spinneret into a bath containing 580 parts of hexamethylene diamine in 5000 parts of water. The resulting monofilament was stretched and dried to yield an elastic thread which is non-yellowing upon prolonged exposure to sun light.

EXAMPLE 40 a. Prepolymer—The following are mixed well until a clear solution is obtained.

To this solution is added 9.15 grams of 2,6-diisocyanato methyl caproate and the resulting solution is mixed for 15 minutes at 25° C., then raised to 80° C. in 45 minutes, and held for two hours at 80° C. A one-gram sample placed on a thermostated brass plate (Fluidimeter) held at 40° C. flows 27 cm. in one minute in the vertical position. Thereafter the mix is cooled and an additional 11.2 grams of the diisocyanate added.

b. To 10.6 g. of propolymer (a) is added the following solution:

|  | Gms. |
|---|---|
| Silicone XL 520 | 0.2 |
| Dibutyl tin dilaurate | 0.3 |
| Triethylamine | 0.3 |
| Water | 1.9 |

The mixture creams in two minutes and completes it rising eight minutes. After aging 16 hours, the foam is cured for two hours at 250° F. There is no loss of gases generated during foaming. A white, resilient, flexible foam is obtained with regular cell structure. Upon two weeks exposure to sunlight, the white flexible foam remains white while an equivalent foam made with tolylene diisocyanate turns brown during this period of exposure.

EXAMPLE 41

*2,6-diisocyanato methyl caproate*

250 grams of lysine monohydrochloride suspended in 2500 ml. of absolute methanol is dissolved by passing into the stirred suspension dry hydrogen chloride. The reaction temperature immediately goes up to 47° C. and in 10 minutes all the solids are dissolved. The gas is passed in for five minutes longer. The reaction mass is then permitted to cool slowly to room temperature with stirring. Crystals start to form in 2.5 hours. The reaction mass is stirred for a period of 15 hours at a temperature of 25° C. The product is precipitated by adding 1.5 liters of diethyl ether over a period of 15 minutes. After one hour of stirring, the product is isolated by filtration and washing with 3 parts of ether dissolved in two parts of methanol, followed by a diethyl ether wash. The product lysine dihydrochloride methyl ester is dried to constant weight at 65° C. in a vacuum oven.

The lysine methyl ester dihydrochloride is finely ground in a mortar and 186 grams is suspended in 2100 ml. of freshly dried and redistilled o-dichlorobenzene in a 3-neck flask.

Phosgene is passed into the reaction vessel at a rapid rate while raising the temperature of the suspension to 150–155° C. As the reaction proceeds the solution becomes clearer and darker. Hydrogen chloride evolution is indicated by fuming from the condenser as it hits the moist atmosphere. After twelve hours, no more hydrogen chloride evolves. Phosgene is passed in for one more hour and nitrogen is then bubbled through the reaction vessel as the solution temperature drops to 25° C., to remove residual phosgene and hydrogen chloride. The remaining solids are removed by filtration and washed. The filtrate is then distilled under reduced pressure. O-dichlorobenzene, the solvent, is distilled at 44° C. and 2 mm. pressure. The product, 2,6-diisocyanato methyl caproate, is distilled at 123° C., at 0.45 mm. pressure. A clear, colorless liquid product is obtained having a refractive index of 1.4565 at 24.5° C.

In an analogous manner, the ethyl, propyl, butyl or pentyl esters of 2,6-diisocyanato caproic acid are prepared by substituting equivalent amounts of ethanol, propanol, butanol or pentanol for methanol in the foregoing procedure.

Similarly, when equivalent amounts of the monohydrochloride of 2,5-diamino valeric acid are substituted for lysine monohydrochloride and equivalent amounts of methanol, ethanol, propanol, butanol or pentanol are employed as the alcohol in the foregoing procedure, the corresponding methyl, ethyl, propyl, butyl or pentyl ester of 2,5-diisocyanato valeric acid is obtained.

EXAMPLE 42

*2,6-diisocyanato-n-octyl caproate*

18.2 g. (0.1 mole) of l-lysine monohydrochloride is suspended in 140 ml. of n-octanol containing 0.24 mole of p-toluenesulfonic acid. The mixture is heated until water and octanol begin to distill and the reaction temperature is then maintained at 120–130° C. by addition of n-octanol. After 240 ml. of n-octanol are added and removed over a two hour period, the residual alcohol is removed by vacuum stripping. The waxy product, the di-p-toluenesulfonate salt of 2,6-diamino-n-octyl caproate, is recrystallized from a mixture of ethanol and diethyl ether.

A solution of 73 grams of this product in 150 ml. methanol is absorbed on a column of 500 ml. of a strongly basic styrene-divinylbenzene anion exchange resin (Dowex 1–X8) which had previously been activated on the hydroxyl cycle with aqueous ammonia, washed to neutrality, and had its water displaced with methanol. The product is eluted from the column with methanol. The free base ester is not isolated but converted to the dihydrochloride by addition of anhydrous HCl and the dihydrochloride recovered by precipitation with diethyl ether. The dihydrochloride is suspended in 275 ml. of toluene and 0.45 mole of phosgene added at 60–70° C. When evolution of HCl ceases, the temperature of the reaction mass is gradually increased to strip out the solvent. The product, 2,6-diisocyanato-n-octyl caproate is recovered by vacuum fractionation, B.P. 137–142° C. at 0.2 mm.

When the foregoing procedure is repeated using equivalent amounts of hexanol, decanol, dodecanol, or tetradecanol in place of octanol, the corresponding hexyl, decyl, dodecyl, or tetradecyl ester of 2,6-diisocyanato caproic acid is obtained.

Similarly, when the foregoing procedure is repeated using equivalent amounts of the monohydrochloride of 2,5-diamino valeric acid in place of the lysine monohydrochloride and equivalent amounts of hexanol, octanol, decanol, dodecanol, or tetradecanol are employed as the alcohol, the corresponding hexyl, octyl, decyl, dodecyl, or tetradecyl ester of 2,5-diisocyanato valeric acid is obtained.

EXAMPLE 43

*2,6-diisocyanato-β-bromoethyl caproate*

A suspension of 18.2 g. (0.1 mol.) of lysine monohydrochloride in 125 g. (1.0 mol.) of ethylene bromohydrin is heated to 100° C. and a stream of anhydrous HBr introduced. The crude product is recovered by removal of unreacted bromohydrin and recrystallized from a methanol-diethyl ether mixture to yield analytically pure 2,6-diamino (β-bromoethyl)caproate dihydrobromide, M.P. 174–176° C.

The above salt is dispersed in o-dichlorobenzene at a level of 1.0 gram/5 ml. and excess phosgene passed in at 110–120° C. After stripping at 0.5 mm. and 160° C., the residue is dissolved in anhydrous benzene, treated with five portions of charcoal and the solvent removed at 25° C. in vacuo. The product, 2,6-diisocyanato β-bromoethyl caproate is recovered as a heavy clear oil, analyzing correctly for C and H.

When the foregoing procedure is repeated using equivalent amounts of 3-chloropropanol and HCl in place of ethylene bromohydrin and HBr, 2,6-diamino γ-chloropropyl caproate dihydrochloride, and 2,6-diisocyanato γ-chloropropyl caproate are obtained.

Similarly, other haloalkyl diisocyanato caproic acid esters are obtained when the foregoing procedure is repeated using equivalent amounts of the appropriate halogenated aliphatic alcohol in place of ethylene bromohydrin.

Haloalkyl 2,5-diisocyanato valeric acid esters are obtained when equivalent amounts of 2,5-diamino valeric acid monohydrochloride is used in place of lysine monohydrochloride, and the appropriate haloalkyl aliphatic alcohol is used in the foregoing procedure.

EXAMPLE 44

*2,6-diisocyanato-β-methoxyethyl caproate*

Following the general procedure of Example 41, 2,6-diamino caproic acid is esterified with β-methoxyethanol, using a 6× molar excess of the alcohol. The product 2,6-diamino - β - methoxyethyl caproate dihydrochloride, M.P. 125–130° C., is recovered as in Example 41.

The above ester is then phosgenated in accordance with the general procedure of Example 41 using an ester:o-dichlorobenzene ratio of 1 gm.:7 ml. The product is distilled, at 135–137° C. at 0.2–0.3 mm. and correctly analyzes for 2,6-diisocyanato-β-methoxyethyl caproate.

Similarly, other alkoxyalkyl 2,6-diisocyanato caproates are obtained by substituting equivalent amounts of the appropriate alkoxy substituted aliphatic alcohol for β-methoxyethanol in the foregoing procedure.

Alkoxyalkyl 2,5-diisocyanato valerates are obtained when equivalent amounts of 2,5-diamino valeric acid is

EXAMPLE 45

*2,6-diisocyanato phenyl caproate*

The acid chloride of lysine dihydrochloride is prepared by passing phosgene through a suspension of lysine dihydrochloride in dioxane for several hours at 50° C. The oily product is added to dimethyl formamide containing the calculated amount of sodium phenoxide to form the phenyl esters of lysine dihydrochloride. This ester is suspended along with a small amount of sodium chloride, in o-dichlorobenzene (0.1 mol in 200 ml.) and phosgenated with gaseous phosgene at 80° C. The resulting carbamyl chloride is decomposed at 130° C. and the solution is filtered, concentrated, treated with absorbent carbon, and the solvent removed to yield yellow 2,6-diisocyanato phenyl caproate which was then purified by molecular distillation.

When the foregoing procedure is repeated using equivalent amounts of the sodium salt of either o-cresol or 2,4,6-trichlorophenol in place of the sodium phenoxide, the o-tolyl or 1,3,5-trichlorophenyl ester of 2,6-diisocyanato caproic acid is obtained respectively.

Similarly, when equivalent amounts of ornithine dihydrochloride are substituted for the lysine dihydrochloride in the above procedure, the corresponding 2,5-diisocyanato valeric acid esters are obtained.

EXAMPLE 46

L-lysine monohydrochloride, 18.2 g., is added to 45.6 g. of p-toluenesulfonic acid monohydrate and 80 cc. of benzyl alcohol. The mixture is heated to 110–120° C. (clear solution at 85–90° C.), while slight vacuum is applied to remove water and benzyl alcohol. Fresh benzyl alcohol is added periodically to maintain the original volume. When 3 x 80 cc. of benzyl alcohol are added and removed in this manner (about 2 hours), the residual alcohol is removed in vacuo. The resulting yellow oil, (benzyl ester of lysine-di-p-toluenesulfonate) is dissolved in 250 cc. of hot ethanol 2B, then cooled to 25° C. and treated with 600 cc. of ether. Crystallization begins at once and the mixture is left overnight at 25° C. The product is collected on a filter and washed with 1:2 ethanol 2B-ether, and dried to constant weight in a 65° C. vacuum oven.

58.0 g., (0.1 M), of this ester is dissolved in 100 cc. of methanol and converted to the dihydrochloride according to the ion exchange procedure of Example 42. The basic eluate, after recycling through the column, is acidified at 0–5° C. with dry hydrogen chloride. The methanol solution is concentrated to 400 cc. and treated with ether to the cloud point. Crystallization is complete after 2 hours. The crystals are collected and washed, with 1:2 methanol:ether. The product is extremely hygroscopic and is immediately placed in the vacuum oven for drying to constant weight.

The l-lysine benzyl ester dihydrochloride prepared above is suspended in 500 cc. dry dioxane. Phosgene is passed in first at 25–35° C. and finally at 65–70° C. until evolution of hydrogen chloride ceases. Filtration and distillation of the reaction solution gives 2,6-diisocyanato benzyl caproate.

When the foregoing procedure is repeated using equivalent amounts of ornithine salts, the corresponding 2,6-substituted valeric acid esters are obtained.

EXAMPLE 47

*2,6-diisocyanato dimethyl pimelate*

2,6-diamino heptanedioic acid (readily obtained by means of fermentation of a nutrient solution with an *E. Coli* mutant as described in U.S. Patent 2,955,986) is converted to the diester dihydrochloride by warming the diacid with excess methanolic hydrogen chloride. The product is recovered by precipitation with 10 volumes of diethyl ether and is then phosgenated at a temperature of 125° C. in o-dichlorobenzene by a procedure similar to that given in Example 41, to yield the 2,6-diisocyanato dimethyl pimelate, a colorless liquid.

When the foregoing procedure is followed substituting equivalent amounts of ethanol, propanol, butanol or pentanol for methanol in the methanolic hydrogen chloride, the corresponding ethyl, propyl, butyl or pentyl diester is obtained.

EXAMPLE 48

*2,9-diisocyanate diethyl sebacate*

Sebacic acid is converted to 2,9-dibromosebacic acid (see Chemical Abstracts 50, 11990 (1956)). The resulting 2,9-dibromosebacic acid is converted to the 2,9-diamino sebacic acid. [Monatsh., 86, 233–50, (1955).] The 2,9-diamino sebacic acid is esterified with ethanolic hydrogen chloride by a procedure similar to that given in Example 41 to form the diester dihydrochloride. The resulting diethyl 2,9-diamino sebacate is phosgenated in dioxane using a procedure similar to that of Example 41 to yield the desired 2,9-diisocyanato diethyl sebacate.

In a manner analogous to the foregoing procedure, the diesters of diisocyanato glutaric acid, diisocyanato adipic acid, and diisocyanato suberic acid are prepared by substituting equivalent amounts of glutaric acid, adipic acid, or suberic acid for sebacic acid, and using methanol, ethanol, propanol, butanol, or pentanol as the alcohol.

EXAMPLE 49

The higher alkyl, haloalkyl, alkoxyalkyl, aryl, haloaryl, alkaryl, and aralkyl diesters of 2,5-diisocyanato adipic acid, 2,6-diisocyanato pimelic acid, 2,7-diisocyanato suberic acid, 2,8-diisocyanato glutaric acid, and 2,9-diisocyanato sebacic acid are obtained by following the procedure of the appropriate foregoing examples for the type of ester desired and using equivalent amounts of reagents.

It will be apparent to those skilled in the art that a wide variety of combinations and variations may be employed in preparing the compositions of the present invention without departing from the spirit and scope of the invention. All such modifications, changes and variations, departing from the above description are intended to be encompassed within the scope of the appended claims.

What is claimed is:

1. The reaction product of a diisocyanate compound having the formula

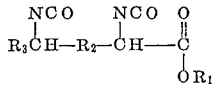

wherein $R_1$ is selected from the group consisting of alkyl, alkaryl, alkoxyalkyl, aryl, aralkyl and brominated and chlorinated derivatives thereof, $R_2$ is selected from the group consisting of lower alkylene and lower alkylidine and $R_3$ is selected from the group consisting of hydrogen and the radical

provided that when $R_3$ is hydrogen, $R_2$ has from 2–4 carbon atoms, with a polyol material sufficient in amount to provide a NCO/OH ratio of from 0.1 to 6.0, the reaction between said diisocyanate and said polyol taking place at a temperature of from 20° C. to 100° C., thereby effecting the reaction between NCO and OH groups and minimizing the reaction between NCO groups and active hydrogens present on groups other than the hydroxyl groups.

2. The reaction product of claim 1 wherein the diisocyanate is either 2,6-diisocyanato methyl caproate or 2,6-diisocyanato octyl caproate.

3. The reaction product of claim 1 wherein the diisocyanate is either 2,6-diisocyanato mehyl caproate or 2,6-diisocyanato octyl caproate, and the polyol is a polyol containing from about 2 to about 6 hydroxyl groups and having a molecular weight of from about 200 to about 3000.

4. The reaction product of claim 3 wherein the polyol is selected from the group consisting of trimethylolpropane, 1,3-butylene glycol, 1,4-butylene glycol, glycerine and pentaerythritol.

5. The method for producing polyurethane compositions which when converted into polyurethane articles yield essentially non-yellowing, gloss-retaining, good adhesive binding capacity articles which comprises reacting a polyol with a diisocyanate compound of the formula

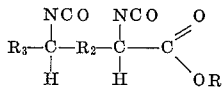

wherein $R_1$ is selected from the group consisting of alkyl, alkaryl, alkoxyalkyl, aryl, aralkyl, and brominated and chlorinated derivatives thereof, $R_2$ is selected from the group consisting of lower alkylene and lower alkylidine radicals and $R_3$ is selected from the group consisting of hydrogen and the radical

provided that when $R_3$ is hydrogen, $R_2$ has from 2–4 carbon atoms.

6. The method according to claim 5 wherein the diisocyanate is either 2,6-diisocyanato methyl caproate or 2,6-diisocyanato octyl caproate and the polyol is a polyol containing from about 2 to about 6 hydroxyl groups and having a molecular weight of from about 200 to about 3000.

7. The method according to claim 6 wherein the polyol is selected from the group consisting of 1,3-butylene glycol, 1,4-butylene glycol, glycerine, pentaerythritol, and trimethylolpropane.

8. A polyurethane foam obtained by foaming, in the presence of water, the reaction product of claim 1 wherein the polyol is trimethylolpropane and the NCO/OH ratio is greater than unity.

References Cited by the Examiner

UNITED STATES PATENTS

| | | | |
|---|---|---|---|
| 2,680,129 | 6/1954 | Flores | 260—453 |
| 2,689,757 | 9/1954 | Haas | 260—478 |
| 2,816,909 | 12/1957 | Kornblum | 260—478 |
| 2,830,077 | 4/1958 | Steadman | 260—482 |
| 2,865,940 | 12/1958 | Nobre et al. | 260—453 |
| 2,929,800 | 3/1960 | Hill | 260—77.5 |
| 2,948,691 | 8/1960 | Windemuth | 260—77.5 |
| 3,014,942 | 12/1961 | Sorques | 260—453 |
| 3,055,931 | 9/1962 | Davis | 260—482 |
| 3,072,712 | 1/1963 | Caldwell | 260—485 |

LEON J. BERCOVITZ, *Primary Examiner.*

M. C. JACOBS, *Assistant Examiner.*